US009374611B2

(12) United States Patent
Pedlow et al.

(10) Patent No.: US 9,374,611 B2
(45) Date of Patent: *Jun. 21, 2016

(54) NAVIGATION WITHIN SWITCHED DIGITAL STREAMED CONTENT

(71) Applicants:Sony Corporation, Tokyo (JP); Sony Electronics Inc., Park Ridge, NJ (US)

(72) Inventors: Leo M. Pedlow, Ramona, CA (US); Stephane Lejeune, San Diego, CA (US)

(73) Assignee: Sony Corporation, Tokyo (JP)

( * ) Notice: Subject to any disclaimer, the term of this patent is extended or adjusted under 35 U.S.C. 154(b) by 16 days.

This patent is subject to a terminal disclaimer.

(21) Appl. No.: 14/605,460

(22) Filed: Jan. 26, 2015

(65) Prior Publication Data

US 2015/0143440 A1    May 21, 2015

Related U.S. Application Data

(60) Continuation of application No. 13/415,030, filed on Mar. 8, 2012, now Pat. No. 8,959,560, which is a continuation of application No. 12/798,533, filed on Apr. 6, 2010, now Pat. No. 8,302,140, which is a division of application No. 11/701,693, filed on Feb. 2, 2007, now Pat. No. 7,814,525.

(60) Provisional application No. 60/771,983, filed on Feb. 9, 2006, provisional application No. 60/856,657, filed on Nov. 3, 2006.

(51) Int. Cl.
*H04N 7/173*     (2011.01)
*H04N 21/434*   (2011.01)
*H04N 5/50*      (2006.01)
*H04N 21/438*   (2011.01)

(52) U.S. Cl.
CPC ............. *H04N 21/4345* (2013.01); *H04N 5/50* (2013.01); *H04N 21/4383* (2013.01)

(58) Field of Classification Search
CPC ...................... H04N 21/4345; H04N 21/4383
See application file for complete search history.

(56) References Cited

U.S. PATENT DOCUMENTS 7,051,361 B1     5/2006   Kim et al.
2002/0104085 A1  8/2002   Takagi et al.

OTHER PUBLICATIONS

The Society of Cable Telecommunications Engineers: American National Standare; ANSI/SCTE 65 2002, Service Information Delivered Out-of-band for Digital Cable Television.
OpenCable Specifications, CableCard Interface 2.0 Specification, OCSP-CCIF2.0-106-060622, Cable Labs, Jun. 22, 2006.
OpenCable Specifications, OpenCable Unidirectional Receiver, SPOCUR-104-060622, Cable Labs, Jun. 22, 2006.

*Primary Examiner* — Joshua Taylor
(74) *Attorney, Agent, or Firm* — John L. Rogitz

(57) ABSTRACT

In certain embodiments, a method carried out in a digital television receiver device incapable of full two way communications, of receiving switched digital television programs involves storing a virtual channel table in the digital television receiver device, the virtual channel table having entries for each available channel and having a channel type indicator that identifies switched digital channels; receiving a command indicative of selection of a switched digital channel having the switched digital channel type indicator in the stored virtual channel table; sending a request from the television receiver device for the switched digital channel; responsive to the request, receiving a response that either grants the request or denies the request; and if the response grants the request, receiving an updated virtual channel table having updated table entries. This abstract is not to be considered limiting, since other embodiments may deviate from the features described in this abstract.

20 Claims, 10 Drawing Sheets

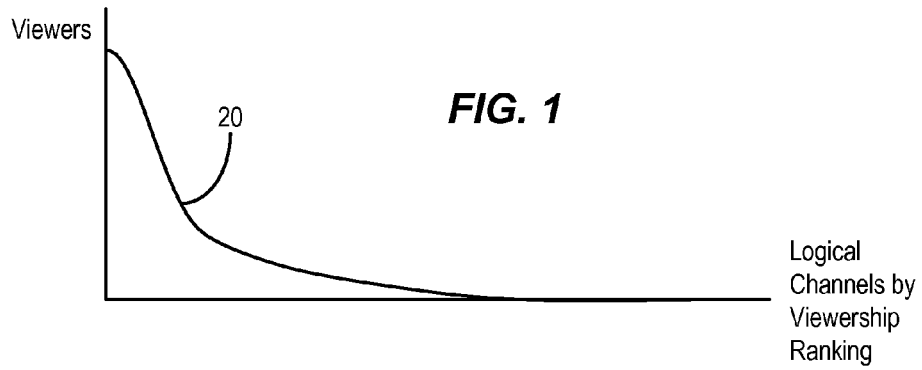
FIG. 1
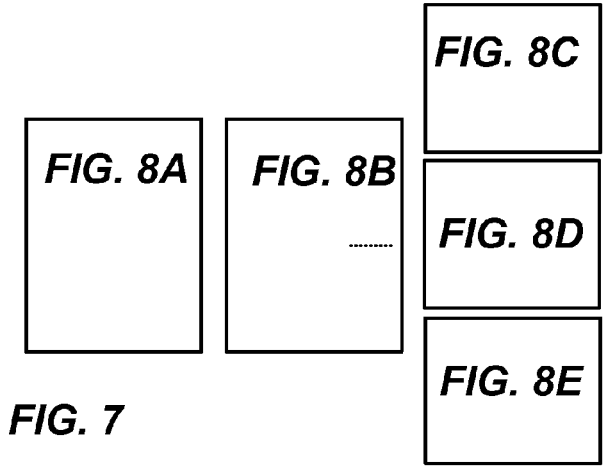

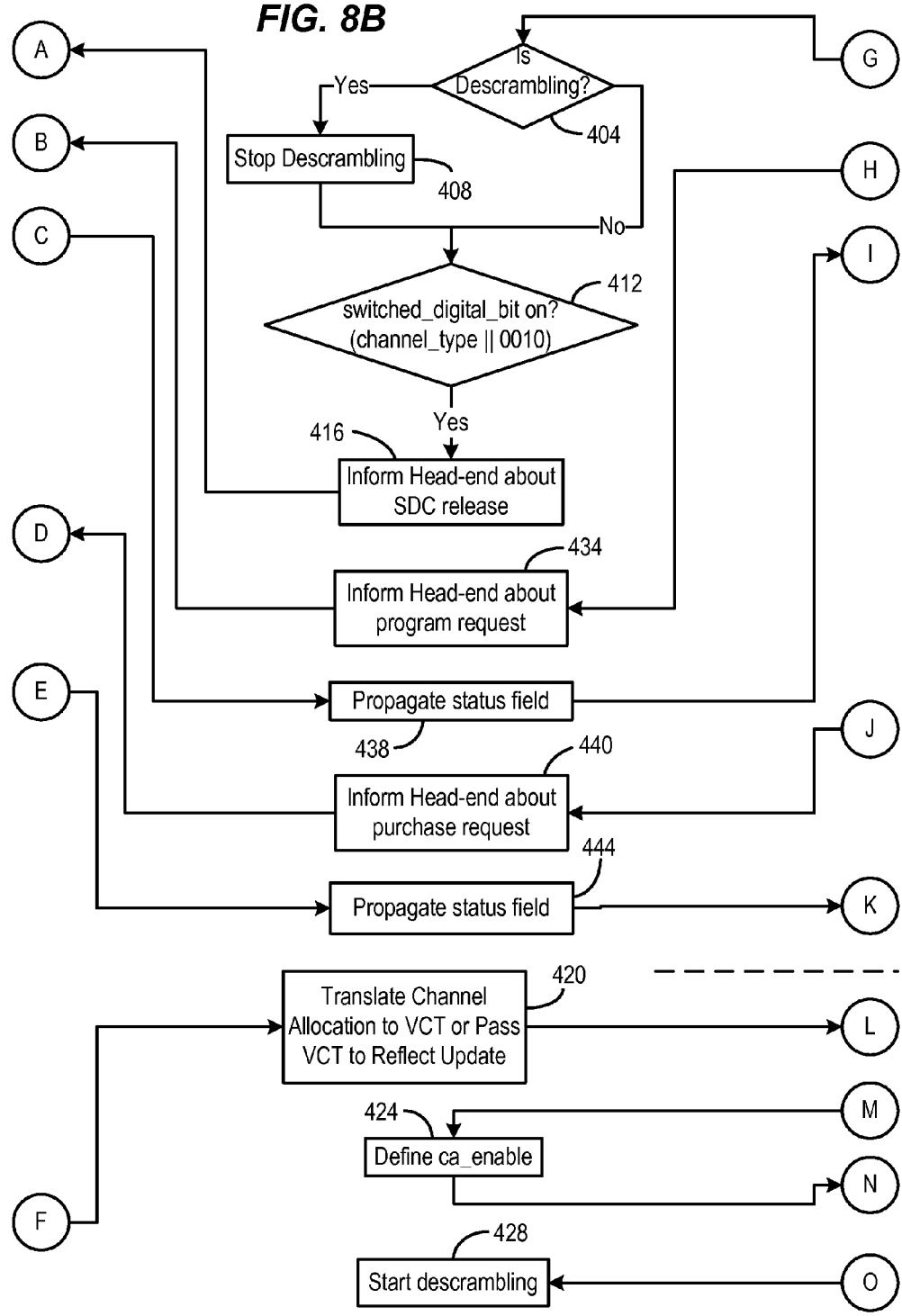

NAVIGATION WITHIN SWITCHED DIGITAL STREAMED CONTENT

CROSS REFERENCE TO RELATED DOCUMENTS

This application is a continuation of pending U.S. patent application Ser. No. 13/415,030 filed Mar. 8, 2012, which is a continuation of Ser. No. 12/798,533 filed Apr. 6, 2010 which is a divisional application of pending U.S. patent application Ser. No. 11/701,693 filed Feb. 2, 2007 and is further related to and claims priority benefit of U.S. provisional Patent Applications No. 60/771,983, filed Feb. 9, 2006 and 60/856,657, filed Nov. 3, 2006, each of which are hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Cable television (or Satellite, Internet or other media) streams can generally be classified by the presence of conditional access (CA) functions, the behavior of the virtual channel table (VCT), and whether so called "trick play" (video tape playback-like functions such as pause and fast forward) are enabled. TABLE 1 below breaks out this categorization.

TABLE 1

Linear = (Static VCT)
Subscription = (Static VCT + CA)
IPPV = (Static VCT + CA)
Switched Digital = (Dynamic VCT)
VOD = (Dynamic VCT + CA + Trick Play)

Switched digital programming takes advantage of the statistics of program viewership to provide a greater selection of programming possibilities, with the associated disadvantage that certain programming may not be available if all of the network's bandwidth is occupied. But under this scenario, the bandwidth is usually better utilized since all channels being broadcast are generally being watched.

Unfortunately, unidirectional digital cable receivers (UDCR) currently cannot support switched digital programming since switched digital programming uses a dynamically changing virtual channel table (VCT) to provide relevant tuning information to the receiver device. Moreover, as switched digital services become more widespread, UDCR receivers may only be enabled to receive progressively smaller portions of the programming available on a given cable network. This means that a stored VCT may be outdated and the logical channels may not be accurately reflected (i.e., the frequency and MPEG service ID parameters appearing in the VCT may be wrong) if a UDCR simply tunes a virtual channel as described in the VCT. Only interactive Digital Cable Ready (iDCR) compliant receivers can be used in such environments—contributing substantially to the cost, and making UDCR devices unsuitable for use in receiving the switched digital programming. This leaves lower cost alternatives to have only very limited functionality in such an environment.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 1 is a graph depicting viewership distribution for a cable television system.

FIG. 6 is a table defining an exemplary channel type code as used in a manner consistent with certain embodiments of the present invention.

FIG. 7 is a diagram depicting the layout of FIG. 8 of the present application.

DETAILED DESCRIPTION

Figure 2:
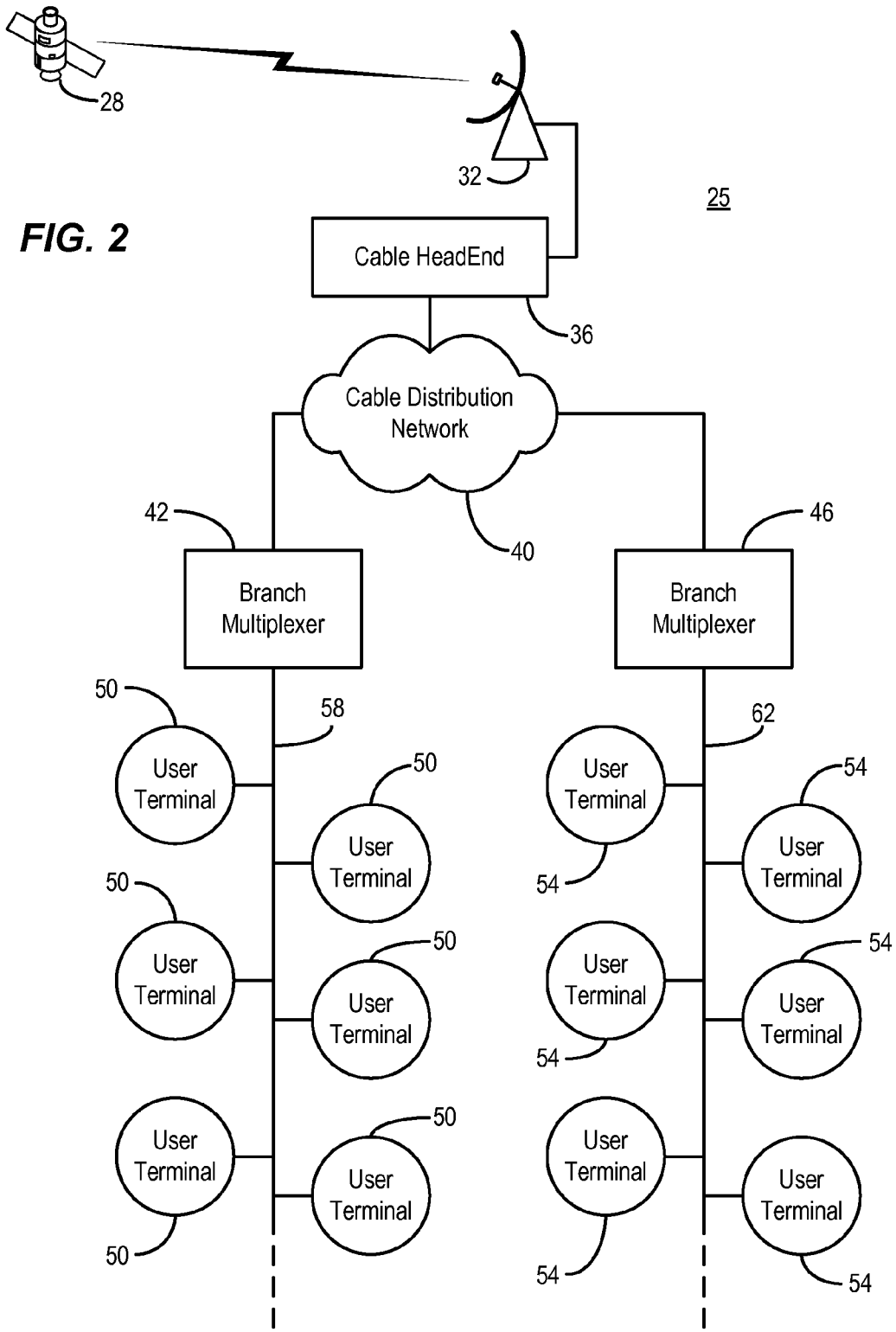
FIG. 2 is illustrates a cable television network consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as for example those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Embodiments consistent with the present invention provide for a low cost category of devices with limited two way communication functionality to provide for operation in a switched digital environment. This provides a simple mechanism for receiving devices to navigate cable television networks implementing switched digital broadcast technology. The method described is compatible with all the currently known various proprietary protocols employed for this process and eliminates the need for the client to employ specialized software to allow tuning and receiving content from switched digital broadcast networks.

In accordance with embodiments consistent with the present invention, consumer electronics (CE) manufacturers would have the ability to make competitive, retail non-OCAP (OpenCable™ Application Platform) devices with functions equivalent to those devices which certain content providers have made available only by leasing of proprietary equipment. Thus, a consumer seeking only basic interactive video services would have a choice between a low-cost, limited-capability set-top box leased by the cable operator, with linear programming and other cable services delivered with the look and feel of the cable operator's choosing, or an integrated digital television ("DTV") or other realization utilizing a CE consumer interface that would not cost significantly more than a receiver device without any built-in navigation features. Such devices would provide a substitutable for limited capability set-top boxes leased by cable operators. Accordingly, to the extent cable operators are permitted to lease limited-capability boxes with integrated security and navigation functionality (i.e., that are not subject to the FCC's integration ban's common reliance requirement), CE manufacturers should be permitted to sell limited-capability devices that do not include OCAP.

According to one survey conducted in a sample cable television system during prime time only a small percentage of the available channels in a given network were actually being viewed. This is depicted by the curve 20 approximating a histogram of the actual channel usage as depicted in FIG. 1. Thus, digital switched channels based upon actual demand for content is an advantageous way to more effectively utilize the available bandwidth and to provide the viewers with more programming choices (with only those actually being viewed actually occupying the available bandwidth). Embodiments consistent with the present invention enable a slightly modified enhanced version of a UDCR or DCR (dubbed UDCR+ or DCR+ herein) to provide for a low end, non-iDCR (iDCR=Interactive Digital Cable Receiver) compliant receiver capable of operation with substantial functionality. The term UDCR may be used herein as generic to UDCR and UDCR+.

In order to best understand embodiments consistent with the present invention, first consider the Virtual Channel Table makeup. The term "Virtual Channel Table" (VCT) or "Virtual Channel Map" (VCM) is used in the manner conventional to the art, and relates to a table that identifies virtual channel names that are recognized to a television viewer to parameters such as frequency and MPEG service identifier information that can be used to access the virtual channel. The term, however, is used loosely in certain embodiments herein to mean any organization of similar data as communicated between the cable service provider and the receiver that conveys similar information, whether or not it actually complies with the VCT or VCM format currently in use by certain equipment suppliers.

A VCT includes information such as the fictitious information that is shown in TABLE 2 below:

TABLE 2

| Virtual Channel # | Virtual Channel Name | Frequency | MPEG Service ID | Channel Type |
|---|---|---|---|---|
| 3 | NBC | 550 MHZ | 3 | 0 |
| 4 | CBS | 550 MHZ | 8 | 0 |
| 5 | ABC | 556 MHZ | 4 | 0 |
| ... | ... | ... | ... | ... |
| 128 | VOD-1 | 568 MHZ | 31 | 1 |
| 129 | VOD-2 | 574 | 27 | 1 |
| ... | ... | ... | ... | ... |
| 236 | Noggin | 580 | 3 | 2 |
| 237 | History | 580 | 4 | 2 |
| ... | ... | ... | ... | ... |

In accordance with embodiments consistent with the present invention, the channel type indicator can be advantageously used in conjunction with minor hardware and software or firmware changes in a CableCARD™ device or similar functional device (i.e., an integrated circuit forming part of a television receiver device of any sort) to provide access to switched digital content in an enhanced UDCR (UDCR+) device. In such a device, limited outbound communication is provided solely for the purpose of requesting service delivery for switched digital channels.

In existing cable systems, the channel type designator is used to distinguish between type 0 (binary 0000) content (conventional streamed programming having relatively fixed virtual channel assignments) and video on demand (VOD—type 1) virtual channels. In unidirectional receivers, a designation of 1 (anything other than binary 0000) for channel type is used to indicate that the data for this channel is not displayed to the user in the Electronic Programming Guide (EPG). Since UDCRs are unable to order VOD content, the EPG need not display an entry in the EPG. In accordance with the present embodiment, an additional designator of 2 (or any of the other available designators 2-15 represented in four bit binary) can be used to identify switched digital content. In accordance with certain embodiments, if switched digital content is available, it can be accessed using the techniques described herein. In other embodiments, the four bit binary channel designator can be parsed into bit by bit definitions such as bit 1=navigation bit, bit 2=tuning parameters defined/undefined, bit 3=switched digital bit and bit 4=hidden/viewable on EPG bit. Other embodiments are also possible without departing from embodiments consistent with the present invention.

FIG. 2 depicts a portion of a cable television installation as is commonly implemented throughout the United States and other countries. This system designated 25 receives content from satellite feeds, such as that depicted from satellite 28 and received by satellite antenna 32. The content received at satellite antenna 32 is supplied to the cable system head end 36. The cable system head end 36 carries out conventional functions, such as multiplexing, encoding, and encrypting in order to produce digital content that is distributed via the cable distribution network 40.

Generally, the distribution carried out in a cable network is divided into geographic regions, each of which may be handled by its own branch multiplexer, such as 42 and 46, for the two regions depicted. Each branch multiplexer can be viewed as a cable head end in and of itself in that the various user terminals 50 and 54 connected to the table network 58 and 62 respectively view the branch multiplexer as the cable head end. Both the branch multiplexers and the cable system head end can be considered sources for content or head ends for purposes of this document, and the source functions can be carried out at either place or both places without limitation. The user terminals 50 and 54 may be one way (UDCR) or two way (iDCR) receiver devices, or can be an enhanced one way (UDCR+) receiver devices such as described herein.

In a switched digital cable environment, each branch 58 and 62 may be transmitting different content depending upon the demands of the various user terminals 50 and 54 respectively. (The term user terminal or television receiver device is used to embrace any receiver device, such as a set top box, set back box or other television receiver device including a television set itself that is compatible with the digital cable network.) If any particular user terminal 50 or 54 is an interactive digital cable receiver (iDCR), then it can be utilized to readily control the content provided by branch multiplexer 42 or 46 respectively. However, a conventional unidirectional digital cable receiver (UDCR) device is only able to receive that content which is designated type 0 in the virtual channel table, and content that is designated as switched digital content is normally unavailable to a UDCR.

Figure 3:
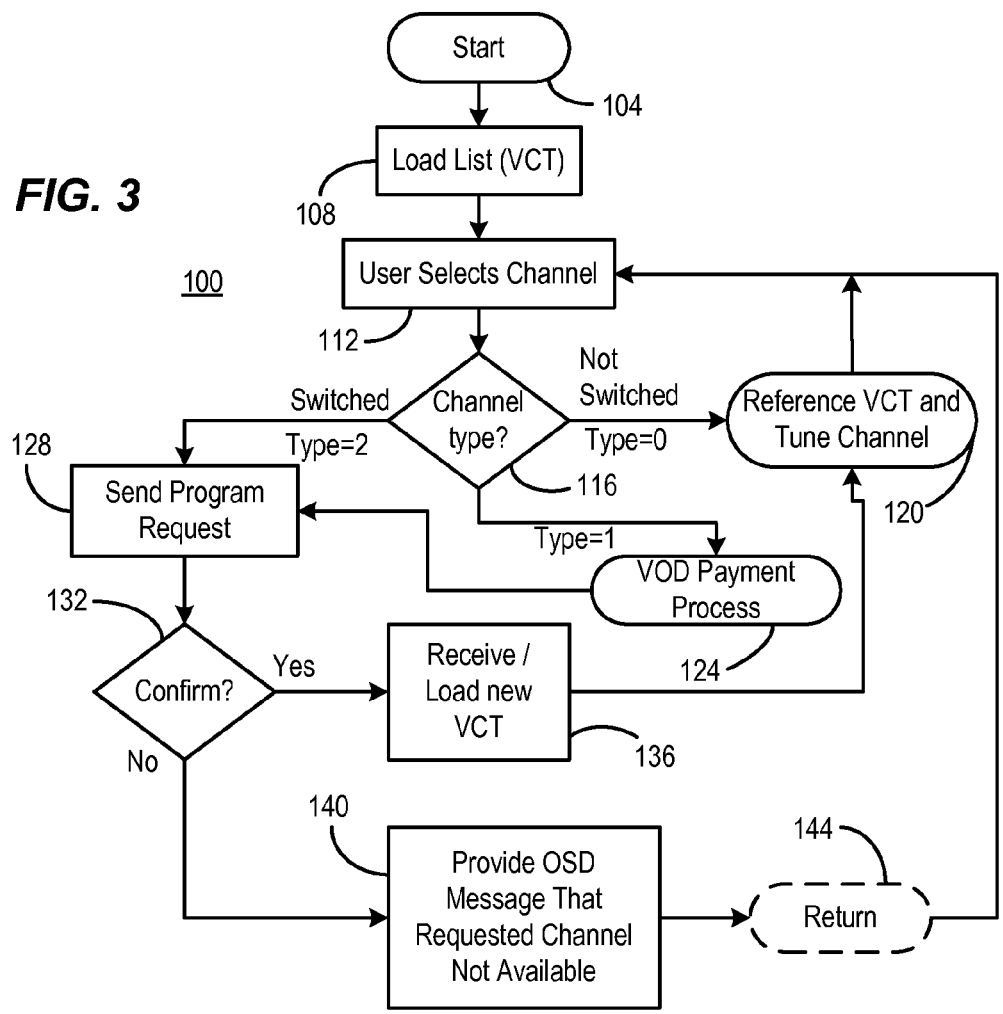
FIG. 3 is a flow chart depicting operation of an exemplary process for channel selection at a user terminal in a manner consistent with certain embodiments of the present invention.

In accordance with embodiments consistent with the present invention, an enhanced unidirectional digital cable receiver can also receive appropriately encoded switched digital content, such as that depicted as type 2 content in the VCT of table 2. An enhanced receiver (UDCR+) consistent with embodiments of the invention may therefore operate, for example, in the manner shown in flowchart 100 of FIG. 3 starting at 104. At 108, the VCT table is loaded into the memory of the enhanced unidirectional receiver, and the process awaits the user selection of a channel at 112. Once the user selects a channel at 112, the channel type in the VCT is examined at 116. In the event the channel is not a switched channel (i.e. a digital switched channel), then the receiver references the VCT and tunes the channel. Control then returns to 112 to await the user's selection of a new channel. In the event the channel type at 116 is type 1, then this designates that a video-on-demand type of content has been selected. This type of content is generally prohibited in a unidirectional digital cable receiver and should generally not be permitted and is generally not even displayed to the user. In the case of a two-directional receiver or UDCR+, however, passes from 124 to 128 where a VOD process would be implemented in a manner similar to switched digital channels as will be described (with 124 representing a payment function for the VOD content, assuming a UDCR+ receiver is to be permitted access to VOD also—iDCR is a high-end set top box with enough memory and CPU to support all the overhead of a JAVA VM. VOD should be considered a type of switched digital. It is a channel switched on when the user requests it and accepts to be billed for it.

If the channel type is type 2 at 116, this designates that a switched digital program is being selected. In the enhanced unidirectional digital cable receiver consistent with certain embodiments, selection of a type 2 digital switched program results in sending a program request at 128 from the receiver to the head end or branch multiplexer in order to request the content. The branch multiplexer or cable head end either grants the request or else denies the request at 132 (e.g., using an SCTE-28 program_conf message with a status field of grant or deny). If the request is granted at 132, a new virtual channel table is broadcast from the branch multiplexer or cable head end at 136. The branch multiplexer or cable head end may also transmit a confirmation message directed to the specific address of the requesting UDCR+ device.

Once the confirmation has taken place, the branch multiplexer or cable head end generates a new VCT (having the most recent accurate data mapping channels to frequency and MPEG identifiers) are transmitted to the UDCR at 136. The UDCR receives the new VCT and utilizes the information therein to tune to the appropriate channel or program selected by the user at 120. Control then returns to 112 as previously. As will be noted later, if a channel change involves tuning away from a switched digital channel, a change to a new channel (switched or unswitched) is interpreted as a release for the currently tuned channel, and it is advantageous to notify the head end that the channel has been released in order to provide for reallocation of bandwidth if possible.

Since the content is switched digital content, there is no guarantee that the user of the receiver device will actually be able to be granted the request for the program as requested at 128 (e.g., as an SCTE-28 program_req( ) message). In the event this request has to be denied due to unavailability of the programming by virtue of inadequate available bandwidth (or any other reason including requests for unauthorized content based upon usage rules and the like), the head end or branch multiplexer informs the UDCR that the program content is not available. At this point, the UDCR provides an on-screen display message that informs the user that the requested channel is not currently available (or unauthorized). The process then returns at 144 to await selection by the user of a new channel at 112. In this manner, with limited communication between the UDCR+ device and the cable head end or branch multiplexer, an enhanced unidirectional receiver can be provisioned to provide access to switched digital content.

Figure 4:
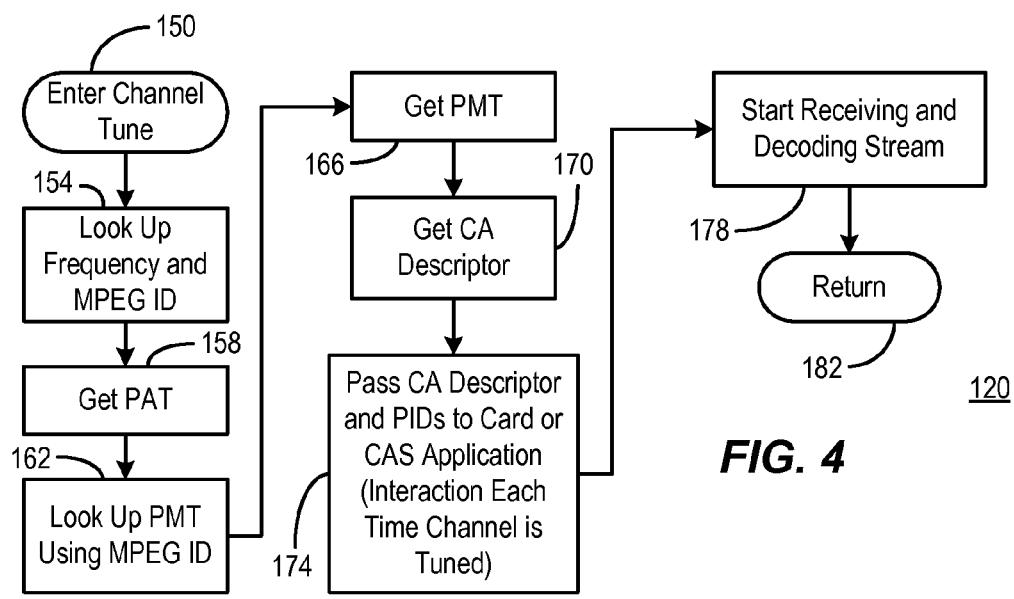
FIG. 4 is a flow chart of an exemplary channel tuning process consistent with certain embodiments of the present invention.

The channel tuning process at 120 is depicted in greater detail in FIG. 4 starting at 150 where the channel tuning process is entered. At 154, the receiver looks up the frequency and MPEG identifiers at 154 using the virtual channel table. At 158, the receiver fetches the program allocation table, and at 162, the program map table is looked up using the MPEG identifier obtained previously. The program map table (PMT) is then retrieved at 166 in order to obtain any conditional access descriptors necessary at 170. At 174, the conditional access descriptors and packet identifiers are passed to the CableCARD™ or other circuitry handling the conditional access functions and tuning functions or to a conditional access application at 174. In this manner, an interaction with the head end and the virtual channel table is carried out each time a channel is tuned. At 178, the receiver can start receiving and decoding the stream of data, and the process returns at 182.

Thus, a method, carried out in a digital television receiver device, of receiving switched digital television programs without need for full interactive two way communication capabilities involves storing a virtual channel table in the digital television receiver device, the virtual channel table having entries for each available channel and having a channel type indicator that identifies switched digital channels; receiving a command indicative of selection of a switched digital channel having the switched digital channel type indicator in the stored virtual channel table; sending a request from the television receiver device for the switched digital channel; responsive to the request, receiving a response that either grants the request or denies the request; and if the response grants the request, receiving an updated virtual channel table having updated table entries.

In certain embodiments, if the request is denied, the receiver displays a message indicating that the requested channel is not available. In certain embodiments, if the request is granted and the requested channel is tuned based upon table entries in the updated virtual channel table. In certain embodiments, the channel type indicator designates a channel as one of a switched digital channel, an unswitched digital channel or a video on demand channel. In certain embodiments, the channel type indicator designates a channel as a four bit binary channel designator wherein one bit represents a navigation bit, one bit designates that tuning parameters are either defined or undefined, one bit designates that a channel is either a switched or unswitched digital channel and one bit designates whether the channel is either hidden or viewable on and electronic programming guide. In certain embodiments, the command indicative of selection of a switched digital channel corresponds to a user selection from an electronic program guide. In certain embodiments, communications associated with requests from the television receiver device for the switched digital channel and providing status of switched digital channels tuned are the only type of outbound communication sent from the television receiver device during any operation. Any of these processes and variations thereof can be carried out using a programmed processor in which a tangible computer readable storage medium stores instructions which, when executed on a programmed processor, carry out the process.

In other embodiments, a method, carried out in a digital television receiver device, of receiving switched digital television programs involves storing a virtual channel table in the digital television receiver device without need for full interactive two way communication capabilities, the virtual channel table having entries for each available channel and having a channel type indicator that identifies each channel as at least one of a switched digital channel, an unswitched digital channel; receiving a command indicative of selection of a switched digital channel having the switched digital channel type indicator in the stored virtual channel table, wherein the command indicative of selection of the switched digital channel corresponds to a user selection from an electronic program guide; sending a request from the television receiver device for the switched digital channel; responsive to the request, receiving a response that either grants the request or denies the request; if the response grants the request, receiving an updated virtual channel table having updated table entries, and tuning the requested channel based upon table entries in the updated virtual channel table; if the request is denied, displaying a message indicating that the requested channel is not available.

In certain embodiments, the channel type indicator designates a channel as a four bit binary channel designator wherein one bit represents a navigation bit, one bit designates that tuning parameters are either defined or undefined, one bit designates that a channel is either a switched or unswitched digital channel and one bit designates whether the channel is either hidden or viewable on and electronic programming guide. In certain embodiments, sending the request from the television receiver device for the switched digital channel and reporting a status of a switched digital channel tuned are the only outbound communications sent from the television receiver device. Other embodiments and variations thereof will occur to those skilled in the art upon consideration of the present teachings.

Figure 5:
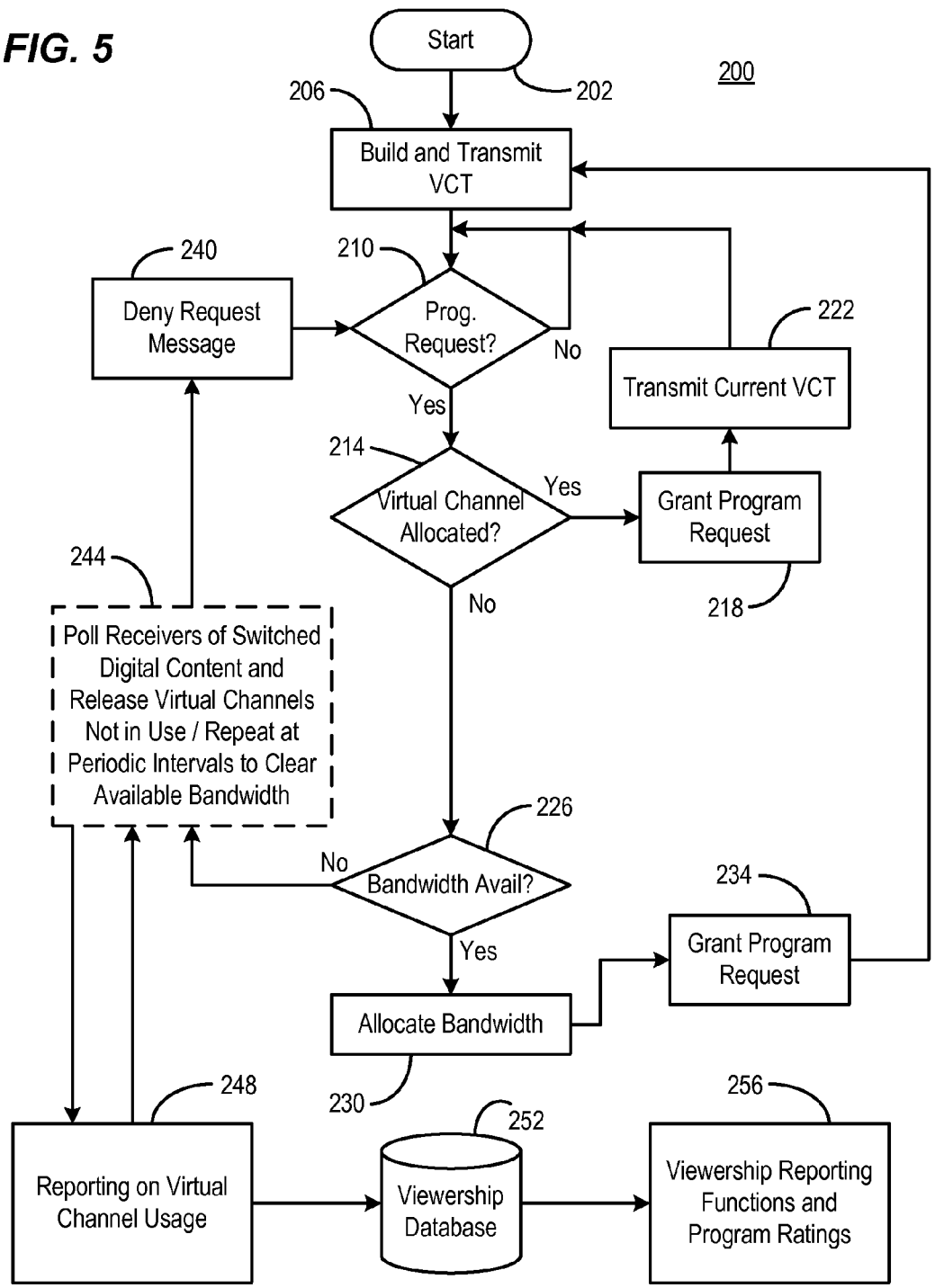
FIG. 5 is a flow chart of an exemplary head end or branch multiplexer operation in a manner consistent with certain embodiments of the present invention.

The actions carried out at the cable head end or branch multiplexer (content source) are detailed in FIG. 5 in flowchart 200 starting at 202. At 206, the head end or branch multiplexer builds and transmits a virtual channel table to the user terminals in the branch network or cable system, depending on the exact configuration of the cable network. The cable head end or branch multiplexer then awaits a program request at 210. When a program request is received at 210, a determination is made as to whether or not the channel has been allocated in the particular branch or network from which the request emanated. This determination is made at 214. If the virtual channel has already been allocated, then the request can be readily granted at 218, and a message to that effect may be transmitted to the requesting user terminal. In order to assure that the requesting user terminal has the most current virtual channel table, the virtual channel table is transmitted at 222 over the network. This is the virtual channel table that is received at 136 of process 100. Control then returns to 210 to await the next program request. In the event a virtual channel has not been allocated at 218, a determination is made as to whether or not the network has enough available bandwidth to grant the request at 226. If so, the bandwidth is allocated at 230, and the program request is granted at 234. A new virtual channel table is then built and transmitted at 206, and the process returns to 210 to await the next program request.

However, if the bandwidth is unavailable at 226, control passes to 240 where the requesting receiver sends a message denying the request for the programming, and control returns to 210 to await the next program request. During the period of time between determination that the bandwidth is not available and denial of the request, in certain embodiments, the process depicted at 244 is carried where receivers of switched digital content are polled in order to determine whether or not the receivers are actually viewing such content. In addition, there may be receivers that are scheduled to record such content using a digital video recorder or similar device rendering the content unreleasable. However, if enough viewers can be determined to actually not be viewing the content in any particular channel, that bandwidth can be reallocated so that the bandwidth is freed up and the request can be granted. In order to simplify the depiction of this operation, block 244 is shown in broken lines and is actually carried out in parallel at periodic or other intervals in order to clear available bandwidth whenever possible.

While not shown in this diagram, if the bandwidth is cleared at 244, the virtual channel can in fact be allocated, and control passes to 214 where the request is granted at 218 and the process proceeds from there. However, in preferred embodiments, the process of 244 is an ongoing process that continually monitors the actual state of usage of the bandwidth in the switched digital network so that users that are not actually viewing content that has been requested can be purged from the list of active users. In this manner, when there are zero active users of a particular segment of the bandwidth, it can be reallocated as requested upon request received at 210. Of course, the head end can also maintain a tally of receivers that are currently tuned to a particular virtual channel (or have designated a particular virtual channel for recording), and can release channels with no viewership. However, a periodic polling to assure that the head end tally is accurate is advantageous.

An additional benefit of monitoring the state of viewership of the switched digital content (as well as unswitched digital content), is that the channel usage can be monitored and reported upon at 248. Data regarding viewership of any particular channel or channels can then be stored in a database at 252 and used for determination of the popularity of various programming, determination of what programming a particular operator will actually provide, and to find or prepare program ratings similar to that currently supplied by the Nielsen Corporation (the Nielsen ratings) using statistical sampling techniques. However, the difference in this case is that actual viewership of an entire population can be ascertained with a high degree of accuracy rather than via approximation using statistical sampling techniques at 256.

Thus, a method of supplying digital television signals involves broadcasting a virtual channel table to a plurality of digital television receiver devices, the virtual channel table having entries for each available channel and having a channel type indicator that identifies switched digital channels; receiving a request from the television receiver device for a selected one of the switched digital channels; determining if the selected channel has been allocated; if the selected channel has been allocated, then granting the request and sending an updated virtual channel table having updated table entries to the television receiver device; if the selected channel has not been allocated, and if bandwidth is available for the selected channel, then allocating bandwidth for the selected channel and transmitting an updated virtual channel table having updated table entries to the television receiver device.

In certain embodiments, the method can further include polling receivers to determine if allocated switched digital channels are being used, and if not releasing the allocated switched digital channel bandwidth. In certain embodiments, the method can further include building a viewership database at least in part based upon the polling. In certain embodiments, the channel type indicator designates a channel as one of a switched digital channel, an unswitched digital channel or a video on demand channel. In certain embodiments, the channel type indicator designates a channel as a four bit binary channel designator wherein one bit represents a navigation bit, one bit designates that tuning parameters are either defined or undefined, one bit designates that a channel is either a switched or unswitched digital channel and one bit designates whether the channel is either hidden or viewable on and electronic programming guide. Other embodiments and variations thereof will occur to those skilled in the art upon consideration of the present teachings.

Referring now to FIG. 6 viewed in conjunction with FIGS. 7 and 8, a more detailed embodiment is provided. In this embodiment, the channel type is designated using a four-bit binary number as explained in the chart 280 of FIG. 6. FIG. 8 can be viewed as a combined flowchart/process chart and signal flow diagram. Due to the size of the diagram, it has been divided into four segments with FIG. 8A representing operations carried out at the head end or branch multiplexer. FIG. 8B represents actions carried out at a CableCARD™ or cable IC or other equivalent circuitry, and FIGS. 8C through 8E represent the host device for the CableCARD™ or cable IC (e.g., a television set or set top box or set back box or any other television receiver device). FIG. 7 depicts an approximate layout of FIGS. 8A through 8E that can be used to configure these drawings in a manner that makes their individual operations and relationships at the various locations somewhat more evident. To further distinguish the source of operations of these charts, head end operations are labeled with 300 series numbers, cable IC or CableCARD™ operations are labeled with 400 series numbers and receiver host operations are labeled with 500 series numbers.

It is also noted that while the process is depicted as a somewhat linear flow, multiple operations may be taking place at the various locations simultaneously (i.e., at the headend, within the cable IC and within the receiver host device). It is further noted that certain of the decision blocks (diamond shaped) have only one output. In these cases, any other decision is not relevant to the present flow, and is therefore omitted for simplicity. The field name designators used in the flow diagrams are those used in the SCTE (Society of Cable Telecommunication Engineers) standard SCTE-28 and SCTE-65 and are established parameters defined in that specification. SCTE-28, SCTE-65 and all specifications referenced therein are hereby incorporated by reference. The source ID is a unique identifier used to identify a source of content that may be identified using a virtual channel when one is assigned.

As used in accordance with embodiments consistent with the present invention, reserved fields in the SCTE-28 specification are used to identify switched digital channels in order to implement the embodiment described below and the 4-bit field defining the channel type in the SCTE 65 specification is extended with the values in FIG. 6. The isosceles trapezoid represents a thread of execution that is waiting for input in a multithreaded system. The thread then executes along the flow diagram and when it reaches an oval it just loops back to the top of the flow where it waits again for the next input.

Figure 8A:
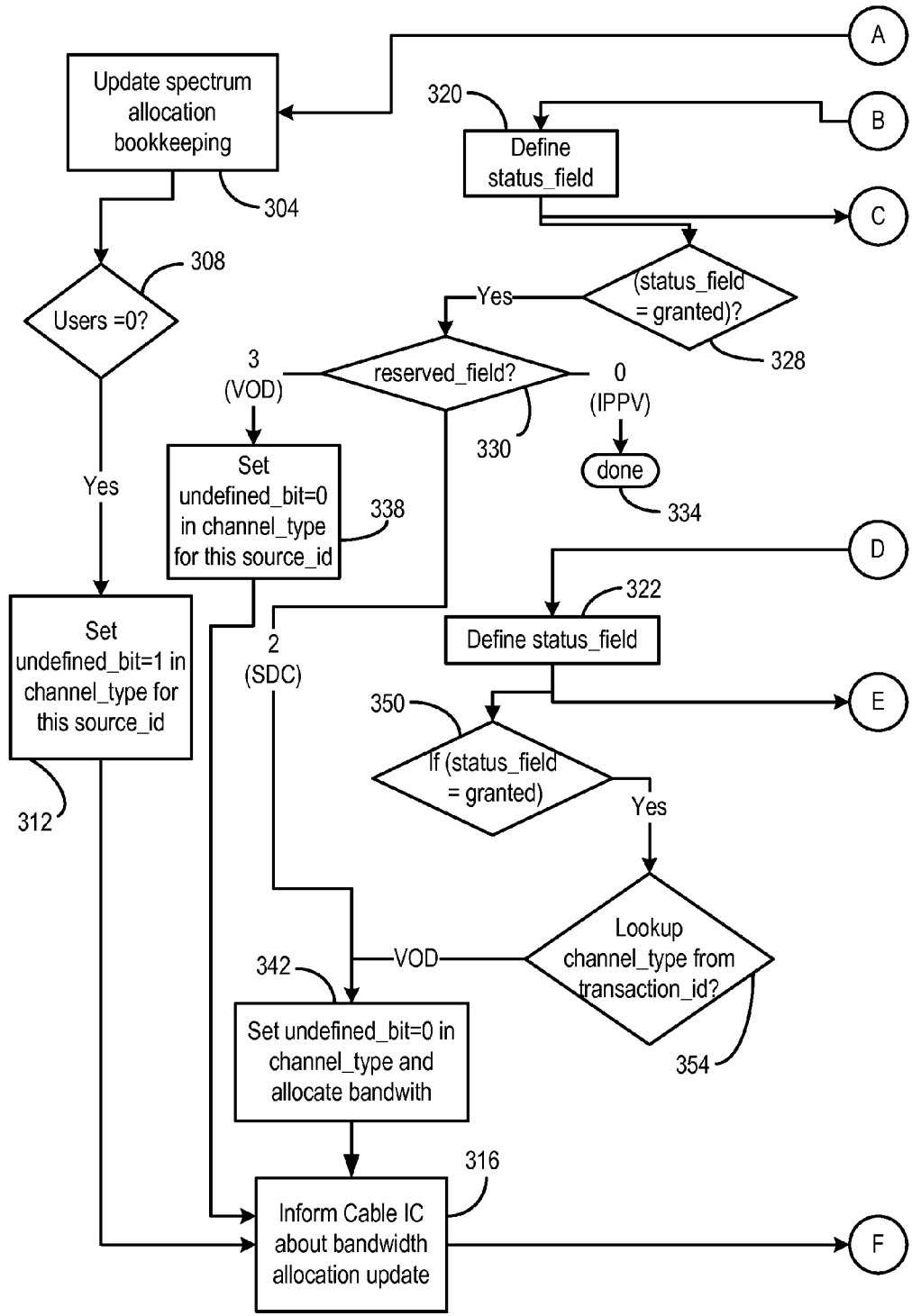
FIG. 8, which is made up of FIG. 8A through 8E is a flow chart and signal flow diagram of certain embodiments consistent with the present invention.
Figure 8C:
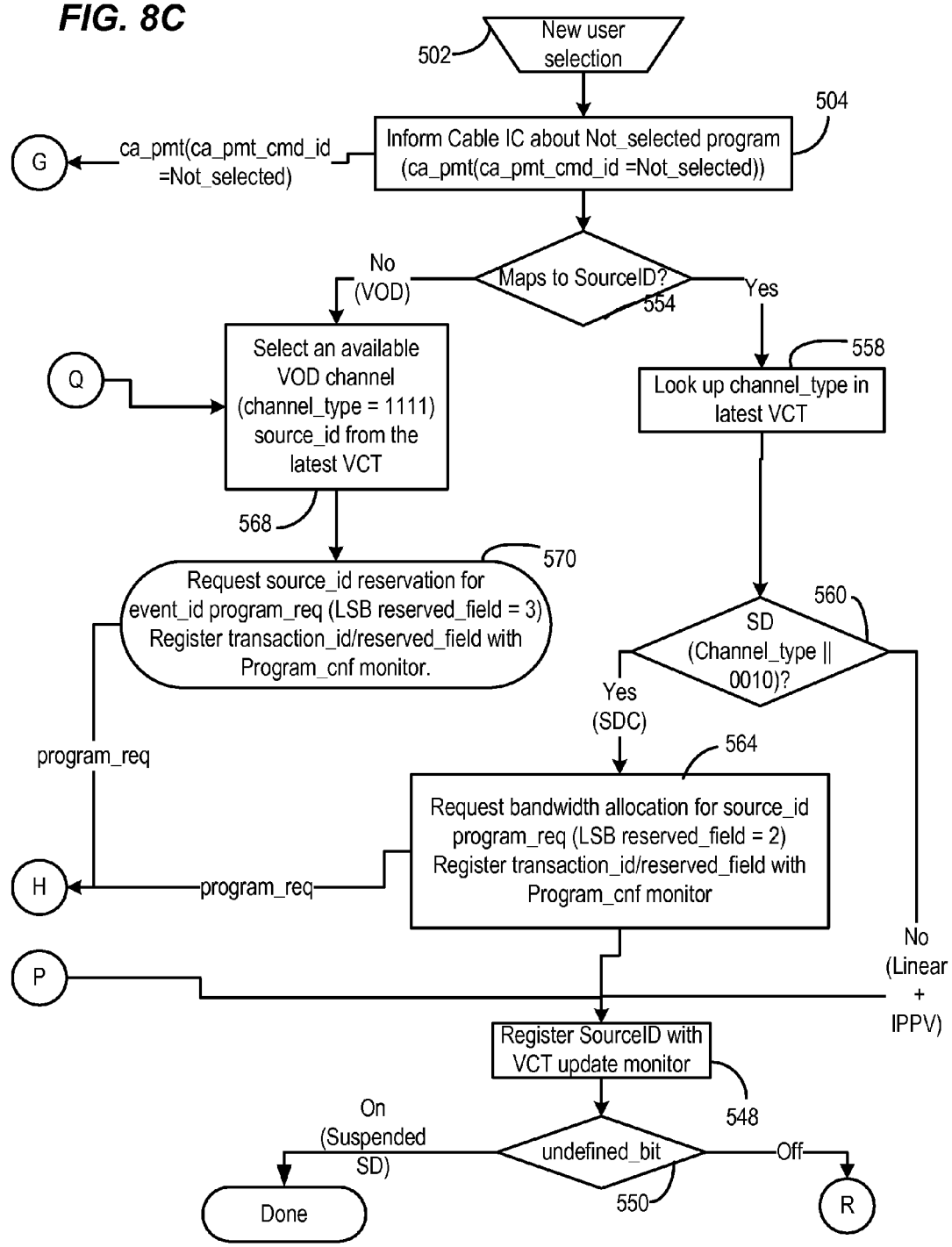
Figure 8D:
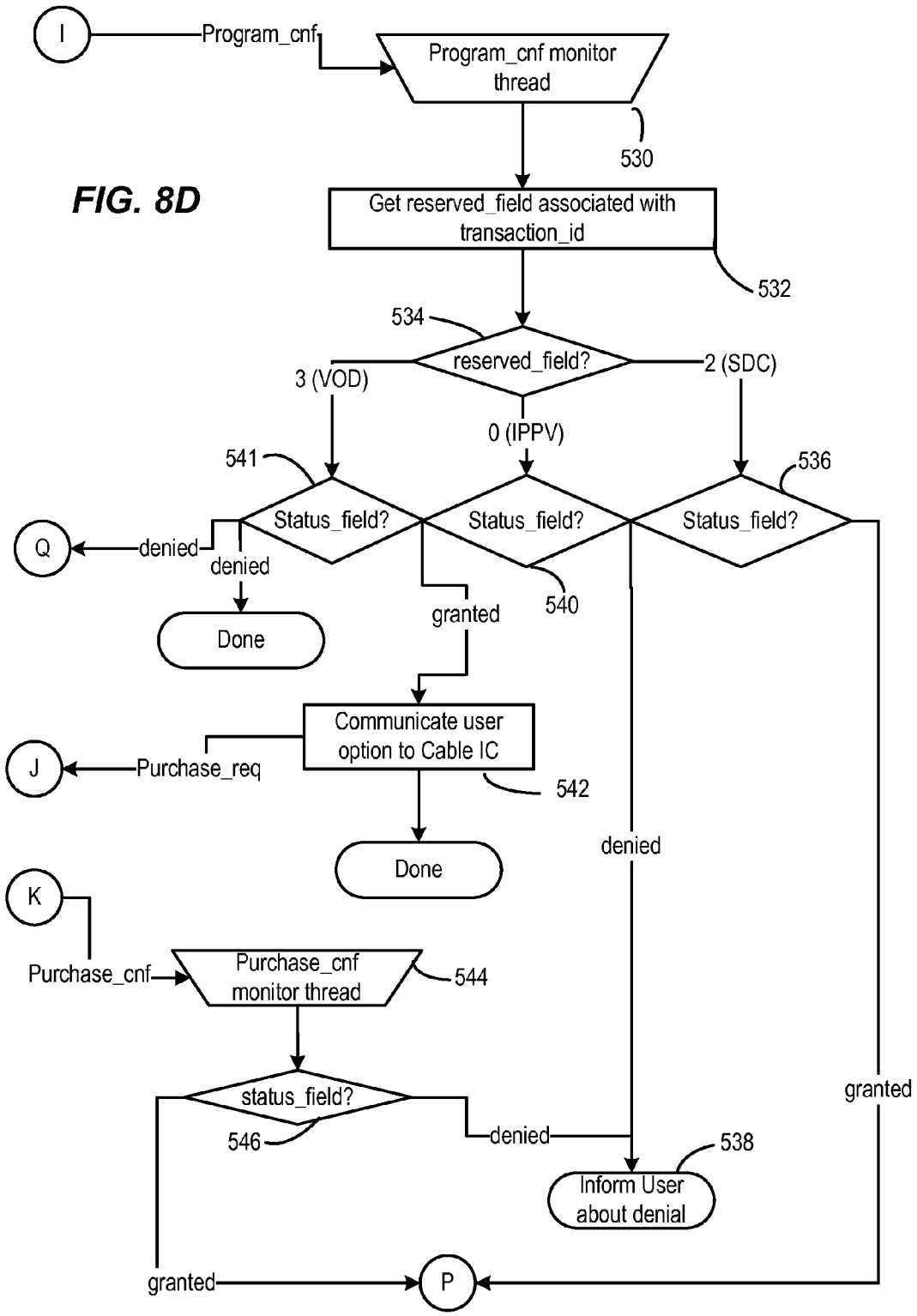
Figure 8E:
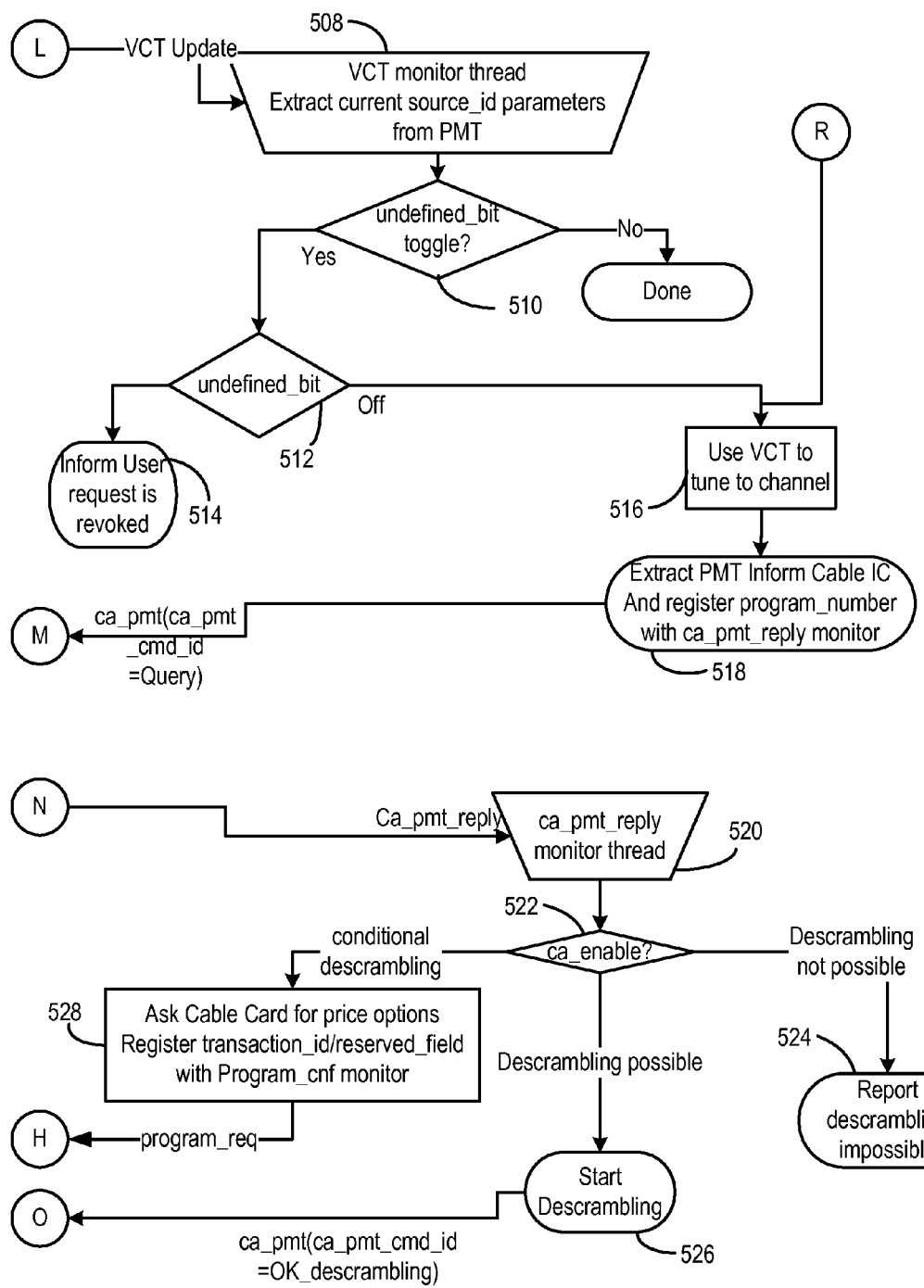

Referring now to FIG. 8, collectively including FIGS. 8A through 8E and starting at 502 of FIG. 8D, when a user elects to change channels, the user makes a selection, which in the case of a switched digital channel, will include deselecting a channel and selecting a new channel. Thus upon selection of a new switched digital channel at 502, the receiver informs the CableCARD™ device or cable IC (these terms will be used interchangeably without limitation herein, without regard for actual implementation details) or other circuitry that the previously tuned channel is no longer being selected at 504. The cable IC receives this message at 404 and determines whether or not a descrambling operation is taking place at 404. If so, control passes to 408 where the descrambling operation is halted. If no descrambling is taking place, control passes directly to 412. If descrambling is taking place it is halted at 408 and control also passes to 412 (thus preserving descrambling resources). At 412, a determination is made as to whether or not the switched digital bit in the channel type indicator is on. If so, the head end is informed at 416 that the receiver device is releasing a switched digital channel.

As noted previously, in a switched digital environment, bandwidth for channels is allocated based upon whether or not a user actually requested to viewing the channel. Hence, the head end continuously updates spectrum allocation based on information received from all users who are capable of selecting switched to digital channels (either by the mechanism just described, polling or a combination thereof). Accordingly, at 304, the head end updates its spectrum allocation bookkeeping, and at 308 determines whether or not the number of users of a particular segment of bandwidth has been reduced to zero or an unacceptably low number. If so, the head end will cease broadcasting the content that was occupying that particular spectrum at 312 by setting a bit in the channel type indicator of the source ID and ceasing transmission using that segment of spectrum.

Control then passes to 316 where the head end bandwidth allocation is updated. This can occur in any of several ways. In certain embodiments, the cable head end will directly modify a virtual channel table (where in this case, the hardware directly communicates with the receivers using an established VCT format such as that defined in Motorola, Inc.'s proprietary VCT format). In other embodiments, however, the information may be packaged in a different manner than that which is technically defined as a virtual channel table, per se. In any event, this information is passed at 316 to 420 in the cable IC.

When the bandwidth allocation information is received at 420, the cable IC either passes through the virtual channel table to reflect the updated VCT, or in the event the information is received in another format, that information is translated to a virtual channel table format at 420. At this point, the VCT update is forwarded to the receiver device at 508. In the event the update affects a channel that is currently being viewed, this update may result in a retuning operation at the receiver device. Otherwise, it merely results in an updated VCT being stored in memory. At 510, a determination is made as to whether or not the undefined bit that determines whether the channel is a switched digital channel or video-on-demand is made. If the undefined bit has toggled and the undefined bit is on at 514, an indication is provided to the user that a channel has been revoked. Otherwise, control passes from 512 to 516 where the VCT is used to tune to the desired channel, and control passes to 518.

As a part of this tuning process at 518, the PMT information is extracted for use in tuning the channel and determining the conditional access parameters necessary. As a result, the receiver asks for conditional access (CA) parameters at 518, and the query is passed to the cable IC at 424. The cable IC then determines at 424 whether or not the conditional access requirements can be met and replies to the receiver device at 520 where the reply is monitored. As a part of this reply at 520, a determination can be made at 522 as to whether or not descrambling is possible. If descrambling is not possible because of failure to meet to a conditional access requirement, a report is provided to the user at 524 that descrambling is not possible. If descrambling is possible, then the descrambling process starts at 526 by sending an okay message to the cable IC at 428 to start descrambling.

In another possibility at 522, conditional descrambling may be available. In this case, the CableCARD™ or cable IC is queried for price options at 528 so that more information can be obtained to permit viewing the content. This is sent in the form of a program request to the cable IC at 434, which in turn informs the head end about the program request. The head end receives the request at 320 and defines the status field. The status field reply is received at 438 of the cable IC process and in turn passed to 530 of the receiver device, wherein the answer is interpreted. At 532, the reserved field associated with the transaction identification is fetched, and a determination is made as to whether or not the reserved field is a zero, which indicates an impulse pay-per-view program, a 2 which indicates it is a switched digital channel, or 3 which indicates it is a video-on-demand (VOD) channel.

If the reserved field is indicative of a switched digital channel, then at 536, the status field is inspected to determine whether or not the request for this switched digital channel has been granted or denied. If the status is granted, control passes to 548. At 548, the source ID is registered with the VCT update monitor, and the undefined bit of 280 is inspected at 550. If the undefined bit is off at 550, control passes to 516, and the VCT can be used to tune the channel. However, if the undefined bit is on, tuning is delayed until a VCT update is received. In the event the status field is denied, the user is informed of the denial at 538, and control returns to 530. In a similar manner, the reserved field at 534 is an impulse pay-per-view (IPPV) channel and the status field is denied, then the user is informed of the denial at 538. If the status field is denied at 541, another VOD channel may be tried and control passes to 568.

If the status field is granted for an impulse pay-per-view channel at 540 or a VOD channel at 541, control passes to 542 where the user's option is communicated to the cable IC for purposes of requesting a purchase. This request is received at the cable IC at 440 and passed along to the cable head end, where at 322, the status field is defined and the status field is then sent to the cable IC at 444, where it is in turn passed to the receiver device at 544. This information is the form of a purchase confirmation received at 544, which can either have a status field indicating that the purchase has been denied or granted. This status field is examined at 546, and if denied, the user is so informed at 538. If the status is granted, control passes to 548. At 548, the source ID is registered with the VCT update monitor, and the undefined bit of 280 is inspected at 550. If the undefined bit is off at 550, control passes to 516, and the VCT can be used to tune the channel. However, if the undefined bit is on, tuning is delayed until a VCT update is received.

Returning to 504, as previously noted, tuning a new switched digital channel involves both un-tuning a current channel and tuning a new channel. When the message regarding deselecting of the old channel is sent to the cable IC from 504 to 404, the selected channel is mapped to a source ID at 554. If there is a mapping at 554, then the channel type is looked up in the latest VCT at 558. If after looking up the channel type in the VCT at 558 the channel type is not switched digital at 560, control passes to 548, and the process proceeds as previously described.

If at 560 the channel is a switched digital channel, bandwidth allocation for the switched channel is requested at 564 in the form of a program request sent to 434 at the cable IC. The process then proceeds as previously described regarding element 434. If at 554, the source ID maps to a video-on-demand selection, an available VOD channel is selected from the latest VCT at 568, and control passes to 570, where a request for the VOD program is sent in the form of a program request to the cable IC element 434. The program request is then processed as previously described.

At the cable head end, once a status field is defined at 320, the head end parallel processes a decision tree in which control passes to 328 where the status field is examined. If the status field is granted at 328, the reserved field is examined at 330. If the reserved field is zero indicating that an impulse pay-per-view selection has been requested, no further processing needs to be carried out and the decision tree terminates at 334. If the reserved field is 3 indicating a video-on-demand reserve field at 330, control passes to 338 where the undefined bit is set to zero, and this information is updated for purposes of the VCT or other format of information at 316. If at 330 the reserved field indicates a switched digital channel, control passes to 342 where the undefined bit is set to zero in the channel type, and bandwidth is allocated. Control then again passes to 316.

Additional parallel processing takes place when a purchase request from 440 passes to 322, and the status field is defined at 322. In this event, if the status field is granted at 350, control passes to 354 where the channel type is looked up from the transaction ID. If this results in a determination of a VOD channel, control then passes to 342, and processing proceeds as previously described.

Those skilled in the art will appreciate that the description just provided of FIG. 8 is best understood by reference to the SCTE-28 and SCTE-65 specification identified above, which explicitly defines and utilizes the parameters described exclusively in the flow chart.

As previously noted, embodiments consistent with the present invention are intended to provide enhanced performance of a UDCR, which has been described as UCDR+. In UDCR, only one-way communication from the head end to the television receiver device is generally possible. However, some communications with the television receiver device transmitting to the cable system head end is utilized to obtain switched digital programming using UDCR+. In order to accomplish this, clearly the cable television receiver device utilizes transmission capabilities. In UDCR+ a transmitter such as 700 depicted in FIG. 10 can be utilized. It is noted that such a transmitter is already present on many commercially available integrated circuits that are being used in UDCR television receiver device. However, in such devices, the transmitter network is generally disabled or not utilized. Hence, in many instances, the additional cost of implementing UDCR+ as described herein is a matter of software programming and enabling a transmitter that is already in place. In other embodiments, a hardware modification may be necessary to either make the transmitter functional or include a transmitter circuit.

Figure 10:
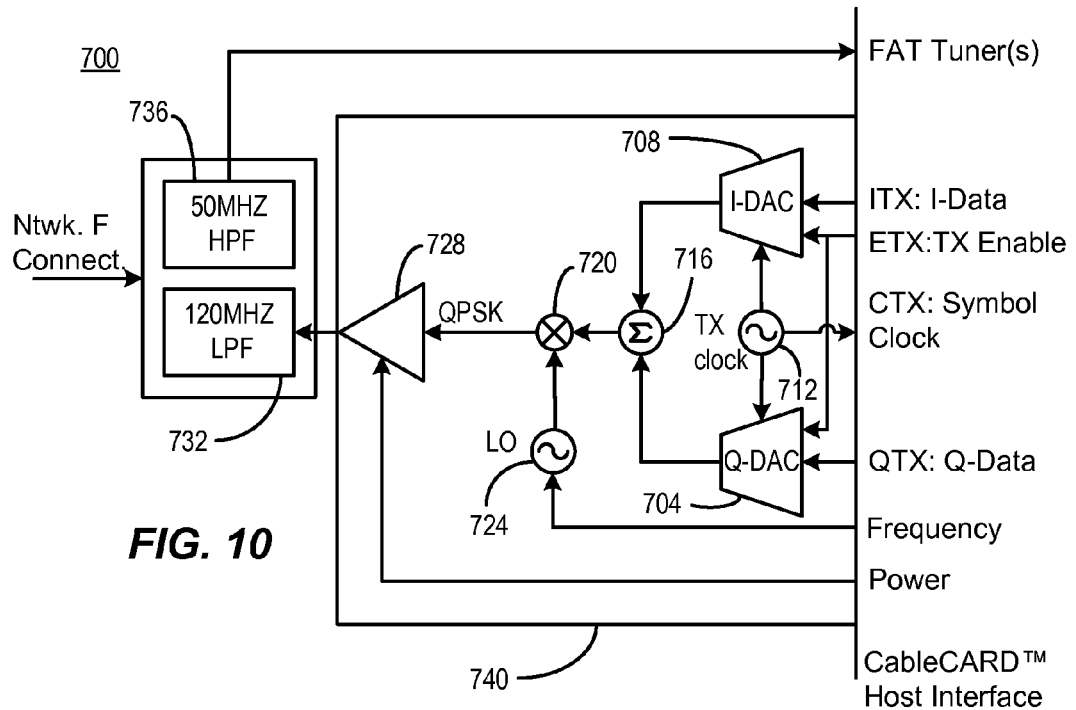
FIG. 10 is a block diagram of an exemplary portion of CableCARD™ device 610 as used to implement an embodiment consistent with the present invention.

Transmitter circuit 700 of FIG. 10 is essentially a QPSK transmitter device that receives I-transmit data and Q-transmit data from the television receiver device, along with a transmit enable signal. The Q-data and I-data are converted to analog signals at 704 and 708 respectively. The digital-to-analog conversion at 704 and 708 operate in conjunction with a transmit clock 712, which is also provided as an output symbol clock to the television receiver device. The output of the I and Q digital-to-analog converters are added together at 716, and their sum is multiplied at 720 with a local oscillator 724. This produces quadrature phase shift keying as an output of 720, which is then amplified at 728 and passed through a low pass filter at 732 to produce an output to the network F connector. Input signals from the network F connector are passed through a 50 megahertz high pass filter at 736 for this embodiment, which passes through to the receiver device tuner. The elements shown within block 740 are generally those that are found within a commercially available transmitter receiver used as cable IC as previously described in connection with FIG. 8.

As noted in FIG. 8, all outbound communication is limited to either requesting a switched digital channel or informing the headend of a current switched digital channel selected or deselected. These are the only signals crossing the boundary from FIG. 8A into FIG. 8B. Thus, the outbound traffic from the UDCR+ receiver device is quite limited, but enables a CE device to have abilities similar to those of devices that would otherwise be required to be leased from a cable system operator.

Figure 9:
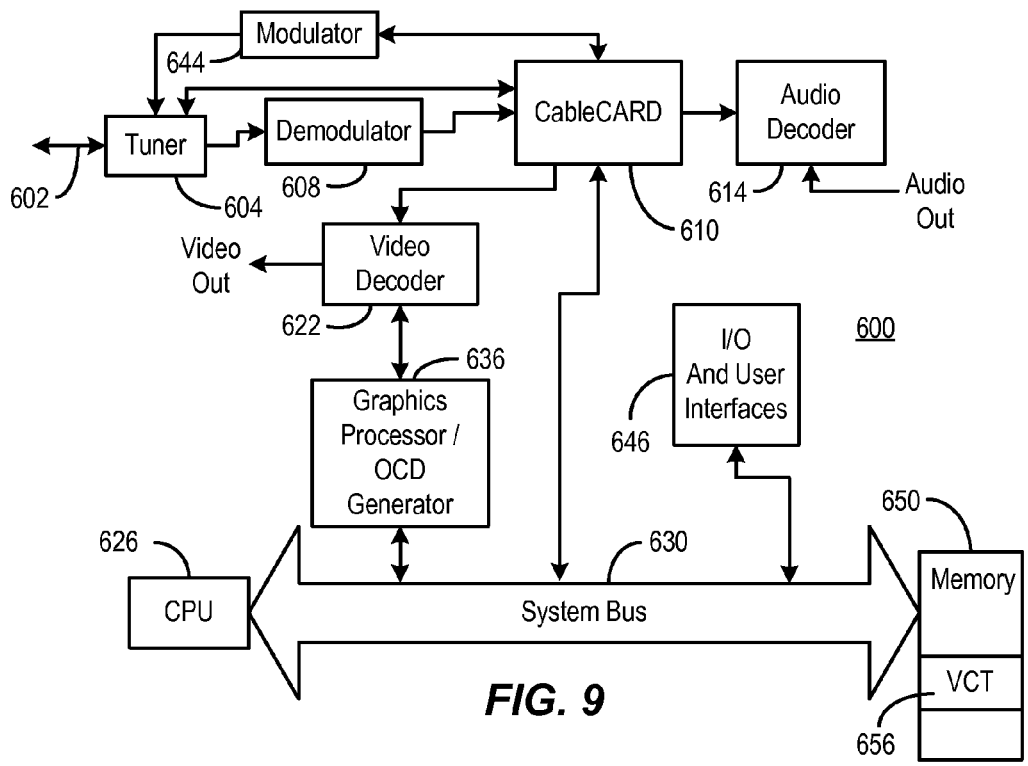
FIG. 9 is a block diagram of an exemplary digital cable receiver device consistent with certain embodiments of the present invention.

Turning now to FIG. 9, a typical system configuration for a digital set-top box 600 is illustrated, however, it should be born in mind that embodiments consistent with the present invention can be embodied in a television set or other television receiver device without limitation. Similar architecture can form a part of any suitable television receiver device including a digital video recorder, set back box or digital television set, etc. without limitation. In this exemplary set-top box, the transmission 602, such as a coaxial cable, is coupled by a suitable interface through a diplexer/tuner 604. Tuner 604 may, for example, include a broadcast in-band tuner for receiving content, an out-of-band (OOB) tuner for receiving data transmissions. A return path provides an OOB return path for outbound data (destined for example for the head end) from CableCARD™ 610. A separate tuner (not shown) may be provided to receive conventional RF broadcast television channels. Modulated information formatted, for example, as MPEG-2 information is then demodulated at a demodulator 608. The demodulated information at the output of demodulator 608 is provided to a CableCARD™ 610 which may include a demultiplexer, descrambler and decoder circuit where the information is separated into discrete channels of programming, descrambled and decoded for playback. The programming is divided into packets, each packet bearing an identifier called a Packet ID (PID) that identifies the packet as containing a particular type of data (e.g., audio, video, data). Audio packets from the CableCARD™ 610 (those identified with an audio PID) are decrypted and forwarded to an audio decoder 614 where they may be converted to analog audio to drive a speaker system (e.g., stereo or home theater multiple channel audio systems) or other audio system 616 (e.g., stereo or home theater multiple channel amplifier and speaker systems) or may simply provide decoded audio out. Video packets from the CableCARD™ 610 (those identified with a video PID) are decrypted and forwarded to a video decoder 622. In a similar manner, data packets from the CableCARD™ 610 (those identified with a data PID) are decrypted and forwarded to CPU 626 for processing via the system bus 630.

Video data decoded by video decoder 122 is output for display. A graphics processor 636, which is a computer optimized to processes graphics information rapidly, generates any onscreen display information (OSD).

STB 600 can operate in a bidirectional communication mode so that data and other information can be transmitted not only from the system's head end to the end user, or from a service provider to the end user of the STB 600, but also, from the end user upstream. In one embodiment, such data passes from CableCARD™ 610 to a modulator 644 through the tuner/diplexer 604 and out through the transmission medium 604. This capability is used to provide a mechanism for the STB 600 and/or its user to send information to the head end (e.g., service requests or changes, registration information, etc.) as well as to provide fast outbound communication with the Internet or other services provided at the head end to the end user. CableCARD™ 610 also provides transmission capability to make program requests as described above.

It is noted that many variations can be imposed including those in which the modulator and demodulator are a part of the CableCARD™ and those wherein functions commonly associated with a CableCARD™ (e.g., CA functions and the like) may be carried out in an integrated circuit or other circuitry forming a part of the television receiver device itself. All such variations can be utilized to implement embodiments consistent with the present invention, without limitation.

Set-top box 600 may include any of a plurality of I/O (Input/Output) interfaces including user interfaces and remote control receivers represented by I/O interfaces 646 that permit interconnection of I/O devices to the set-top box 600. By way of example, and not limitation, a serial RS-232 port, an Ethernet port, a USB (Universal Serial Bus) port, an IEEE 1394 (so-called Firewire™ or i-link™) or IEEE 1394 port, S-video port or infrared port. Such interfaces can be utilized to interconnect the STB 600 with any of a variety of accessory devices such as storage devices, audio/visual devices. Additionally, a control panel user interface may form a part of I/O interface 646.

STB 600 also includes storage devices represented by memory 650 which may be any combination of storage devices including Random Access Memory (RAM), Read Only Memory (ROM), Flash memory, Electrically Erasable Programmable Read Only Memory (EEPROM), etc. The VCT 656 is stored in memory 650.

While the above exemplary system including STB 600 is illustrative of the basic components of a digital set-top box suitable for use with the present invention, the architecture shown should not be considered limiting since many variations of the hardware configuration are possible without departing from the present invention.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

While certain embodiments herein were described in conjunction with specific circuitry that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

Software and/or firmware embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of supplying digital television signals, comprising:
    broadcasting a virtual channel table to a plurality of digital television receiver devices, the virtual channel table having entries for each available channel and having a channel type indicator that identifies switched digital channels;
    receiving a request from one of the plurality of television receiver devices for a selected one of the switched digital channels, where the one of the plurality of television receiver devices is incapable of any transmission except a transmission requesting a switched digital channel and a transmission providing a status of tuning a switched digital channel;
    determining if the selected channel has been allocated; if the selected channel has been allocated, then granting the request and sending an updated virtual channel table having updated table entries to the television receiver device; and
    if the selected channel has not been allocated, and if bandwidth is available for the selected channel, then allocating bandwidth for the selected channel and transmitting an updated virtual channel table having updated table entries to the television receiver device,
    polling receivers to determine if allocated switched digital channels are being used, and if not releasing the allocated switched digital channel bandwidth;
    building a viewership database at least in part based upon the polling.

2. The method according to claim 1, further comprising polling receivers to determine if allocated switched digital channels are being used, and if not releasing the allocated switched digital channel bandwidth.

3. The method according to claim 2, further comprising building a viewership database at least in part based upon the polling.

4. The method according to claim 1, where the channel type indicator designates a channel as one of a switched digital channel, an unswitched digital channel or a video on demand channel.

5. The method according to claim 1, where sending the request from the television receiver device for the switched digital channel comprises sending an SCTE-28 program_req( ).

6. The method according to claim 1, where the channel type indicator comprises data that designates that a channel is either a switched or unswitched digital channel.

7. The method according to claim 1, where the channel type indicator comprises data that includes a navigation bit.

8. The method according to claim 1, where the channel type indicator comprises data that designates that tuning parameters are either defined or undefined.

9. The method according to claim 1, where the channel type indicator comprises data that designates that the channel is either hidden or viewable on an electronic programming guide.

10. The method according to claim 1, where the channel type indicator comprises a channel designator containing data that designates that tuning parameters are either defined or undefined, data that designates that a channel is either a switched or unswitched digital channel, and data that designates whether the channel is either hidden or viewable on an electronic programming guide.

11. The method according to claim 1, where the channel type indicator comprises a channel designator containing data that represents a navigation bit, data that designates that tuning parameters are either defined or undefined, data that designates that a channel is either a switched or unswitched digital channel or a video on demand channel, and data that designates whether the channel is either hidden or viewable on an electronic programming guide.

12. A method of supplying digital television signals, comprising:

broadcasting a virtual channel table to a plurality of digital television receiver devices, the virtual channel table having entries for each available channel and having a channel type indicator that identifies switched digital channels, and where the channel type indicator designates a channel as one of a switched digital channel, an unswitched digital channel or a video on demand channel;

receiving a request from one of the plurality of television receiver devices for a selected one of the switched digital channels, where the one of the plurality of television receiver devices is incapable of any transmission except a transmission requesting a switched digital channel and a transmission providing a status of tuning a switched digital channel;

determining if the selected channel has been allocated;

if the selected channel has been allocated, then granting the request and sending an updated virtual channel table having updated table entries to the television receiver device;

if the selected channel has not been allocated, and if bandwidth is available for the selected channel, then allocating bandwidth for the selected channel and transmitting an updated virtual channel table having updated table entries to the television receiver device;

polling receivers to determine if allocated switched digital channels are being used, and if not releasing the allocated switched digital channel bandwidth;

building a viewership database at least in part based upon the polling.

13. The method according to claim 12, where sending the request from the television receiver device for the switched digital channel comprises sending an SCTE-28 program_req( ).

14. The method according to claim 12, where the channel type indicator designates a channel as one of a switched digital channel, an unswitched digital channel or a video on demand channel.

15. The method according to claim 12, where the channel type indicator comprises data that includes a navigation bit.

16. The method according to claim 12, where the channel type indicator comprises data that designates that tuning parameters are either defined or undefined.

17. The method according to claim 12, where the channel type indicator comprises data that designates that the channel is either hidden or viewable on an electronic programming guide.

18. The method according to claim 12, where the channel type indicator comprises a channel designator containing data that designates that tuning parameters are either defined or undefined, data that designates that a channel is either a switched or unswitched digital channel and data that designates whether the channel is either hidden or viewable on an electronic programming guide.

19. The method according to claim 18, where the channel type indicator designates a channel as one of a switched digital channel, an unswitched digital channel or a video on demand channel.

20. The method according to claim 18, further comprising polling receivers to determine if allocated switched digital channels are being used, and if not releasing the allocated switched digital channel bandwidth and building a viewership database at least in part based upon the polling.

* * * * *